United States Patent
Bullock

(10) Patent No.: US 6,564,875 B1
(45) Date of Patent: May 20, 2003

(54) PROTECTIVE DEVICE FOR THREADED PORTION OF TUBULAR MEMBER

(75) Inventor: Michael Bullock, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/679,907

(22) Filed: Oct. 5, 2000

Related U.S. Application Data

(60) Provisional application No. 60/159,082, filed on Oct. 12, 1999.

(51) Int. Cl.⁷ .................................................. E21B 23/02
(52) U.S. Cl. ...................... 166/382; 166/196; 166/207; 166/242.6; 285/45; 285/334; 285/355
(58) Field of Search .................. 166/207, 206, 166/180, 182, 196, 210, 242.6, 242.7, 382; 138/96 T; 285/45, 333, 334, 355

(56) References Cited

U.S. PATENT DOCUMENTS

| 3,915,478 | A | * | 10/1975 | Al et al. ........................ 285/45 |
| 4,304,428 | A | * | 12/1981 | Grigorian et al. ............ 285/333 |
| 4,366,971 | A | * | 1/1983 | Lula ............................. 285/55 |
| 4,379,471 | A | * | 4/1983 | Kuenzel ....................... 138/89 |
| 4,796,668 | A | * | 1/1989 | Depret ...................... 138/96 T |
| 5,332,049 | A | * | 7/1994 | Tew ............................. 175/320 |
| 5,339,894 | A | * | 8/1994 | Stotler ........................ 166/182 |
| 5,351,752 | A | * | 10/1994 | Wood et al. .................. 166/68 |
| 5,474,334 | A | * | 12/1995 | Eppink ........................ 285/184 |
| 5,576,485 | A | * | 11/1996 | Serata ..................... 73/152.17 |

* cited by examiner

Primary Examiner—William Neuder
Assistant Examiner—Zakiya Walker
(74) Attorney, Agent, or Firm—Haynes and Boone, LLP; Todd Mattingly

(57) ABSTRACT

A device for protecting the internally threaded end portion of a tubular member includes an externally threaded portion for engaging the internally threaded portion of the tubular member and a collar for engaging the exterior of the internally threaded end portion of the tubular member.

12 Claims, 1 Drawing Sheet

PROTECTIVE DEVICE FOR THREADED PORTION OF TUBULAR MEMBER

CROSS REFERENCE TO RELATED APPLICATIONS

This application claims the benefit of the filing date of U.S. Provisional Patent Application serial No. 60/159,082, filed on Oct. 12, 1999.

This application is related to the following co-pending patent applications:

| U.S. Provisional Patent Application Number | Attorney Docket No. | Filing Date |
| --- | --- | --- |
| 60/108,558 | 25791.9 | Nov. 16, 1998 |
| 60/111,293 | 25791.3 | Dec. 7, 1998 |
| 60/119,611 | 25791.8 | Feb. 11, 1999 |
| 60/121,702 | 25791.7 | Feb. 25, 1999 |
| 60/121,841 | 25791.12 | Feb. 26, 1999 |
| 60/121,907 | 25791.16 | Feb. 26, 1999 |
| 60/124,042 | 25791.11 | Mar. 11, 1999 |
| 60/131,106 | 25791.23 | Apr. 26, 1999 |
| 60/137,998 | 25791.17 | June 7, 1999 |
| 60/143,039 | 25791.26 | Jul. 9, 1999 |
| 60/146,203 | 25791.25 | Jul. 29, 1999 |
| 60/154,047 | 25791.29 | Sept. 16, 1999 |
| 60/159,039 | 25791.36 | Oct. 11, 1999 |
| 60/159,033 | 25791.37 | Oct. 11, 1999 |

Applicants incorporate by reference the disclosures of these applications.

BACKGROUND OF THE INVENTION

This invention relates generally to wellbore casings, and in particular to wellbore casings that are formed using tubing having threaded portions.

Conventional tubing used to form wellbore casings includes internally threaded portions at one end and externally threaded portions at another end. The internal threaded portions can be damaged during handling.

The present invention is directed to overcoming one or more of the limitations of the existing procedures for forming wellbores.

SUMMARY OF THE INVENTION

According to one aspect of the present invention, a device for protecting an end portion of a tubular member having an internally threaded portion is provided that includes a locking member having an externally threaded portion adapted to threadably mate with the internally threaded portion of the tubular member, and a collar adapted to mate with the locking member and an end portion of the tubular member.

According to another aspect of the present invention, a method of protecting an end portion of a tubular member having an internally threaded portion is provided that includes supporting the internally threaded portion of the tubular member and supporting the exterior of the end portion of the tubular member.

According to another aspect of the present invention, a method of protecting the end portions of a plurality of tubular members having internally threaded portions is provided that includes coupling a locking member to the internally threaded portions of the tubular members and coupling a collar to the end portions of the tubular members and the locking members. The wall thicknesses of the collars vary as a function of the wall thicknesses of the end portions of the tubular members.

DETAILED DESCRIPTION

Figure 1:
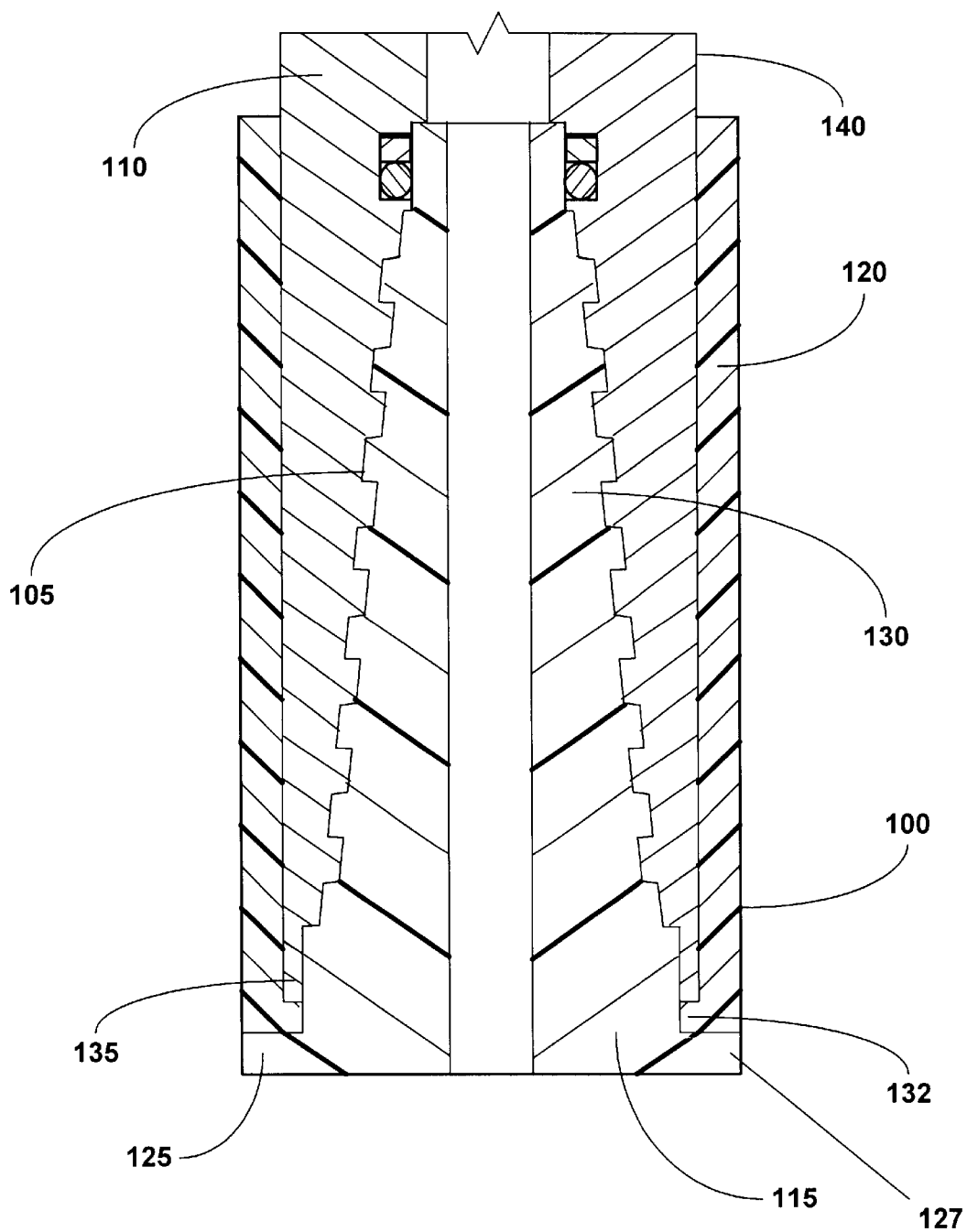
FIG. 1 is a cross sectional illustration of a tubular member having an internally threaded portion at one end and a protective device for protecting the internally threaded portion at the one end of the tubular member.

A device for protecting the threaded portion of a tubular member is provided. The device includes a locking member for threadably engaging the internal threads of the tubular member and a collar for supporting and engaging the external surface of the tubular member. In this manner, the internally threaded portion of the tubular member is protected from damage during handling.

In FIG. 1, a preferred embodiment of a device 100 for protecting the internally threaded portion 105 of a tubular member 110 includes a locking member 115 and a collar 120.

The locking member 115 is removably coupled to the internally threaded portion 105 of the tubular member 110 and the collar 120. The locking member 115 preferably has a substantially annular cross section. The locking member 115 preferably includes a base 125 having a external flange 127 and an externally threaded portion 130 that extends from and is coupled to the base 125. The flange 127 of the base 125 is preferably adapted to engage the collar 120. The externally threaded portion 130 is preferably adapted to engage the internally threaded portion 105 of the tubular member 110.

The collar 120 is removably coupled to the tubular member 110 and the locking member 115. The collar 120 preferably has a substantially annular cross section. The collar 120 preferably includes an internal flange 132 that is adapted to engage an end portion 135 of the tubular member 110 and the base 125 of the locking member 105. The wall thickness of the collar 120 is preferably selected to provide structural support and protection for the end portion 135 of the tubular member 110 including the internally threaded portion 105. In a preferred embodiment, the collar 120 is adapted to extend along the length of the end 135 of the tubular member 110 beyond the internally threaded portion 105. In this manner, the thinner walls of the internally threaded portion 105 of the tubular member 110 are optimally protected and structurally supported.

The locking member 115 and the collar 120 may be fabricated from any number of conventional commercially available materials. In a preferred embodiment, the locking member 115 and collar 120 are fabricated from plastic in order to absorb shock loads and optimally protect the tubular member.

In a preferred embodiment, the locking member 115 and the collar 120 are coupled to the internally threaded portion 105 of the tubular member 110 during shipment and handling of the tubular member 110. In this manner, the damage to the internally threaded end portion 135 of the tubular member 110 is minimized. In a preferred embodiment, a plurality of collars 120, having a range of wall thicknesses are provided, in order to optimally provide protection and structural support to a plurality of tubular members 110 having varying wall thicknesses at internally threaded end portions.

A device for protecting an end portion of a tubular member having an internally threaded portion has been described that includes a locking member having an externally threaded portion adapted to threadably mate with the internally threaded portion of the tubular member, and a collar adapted to mate with the locking member and an end portion of the tubular member.

A method of protecting an end portion of a tubular member having an internally threaded portion has also been described that includes supporting the internally threaded portion of the tubular member and supporting the exterior of the end portion of the tubular member.

A method of protecting the end portions of a plurality of tubular members having internally threaded portions has also been described that includes coupling a locking member to the internally threaded portions of the tubular members and coupling a collar to the end portions of the tubular members and the locking members. The wall thicknesses of the collars vary as a function of the wall thicknesses of the end portions of the tubular members.

Although this detailed description has shown and described illustrative embodiments of the invention, this description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention.

What is claimed is:

1. A device for protecting an end portion of an expandable tubular member comprising an internally threaded portion, comprising:
   a locking member having an externally threaded portion adapted to threadably mate with the internally threaded portion of the expandable tubular member; and
   a collar adapted to mate with the locking member and an end portion of the expandable tubular member;
   wherein the expandable tubular member comprises a casing for a wellbore.

2. The device of claim 1, wherein the locking member further comprises:
   a flange coupled to an end portion of the locking member for engaging the collar.

3. The device of claim 1, wherein the collar comprises:
   a flange coupled to an end of the collar for engaging the tubular member.

4. The device of claim 1, wherein the locking member further comprises:
   a flange coupled to an end portion of the locking member for engaging the collar; and
   wherein the collar includes a flange coupled to an end of the collar for engaging the expandable tubular member.

5. The device of claim 4, wherein the collar is adapted to mate with an external surface of the expandable tubular member.

6. A method of protecting an end portion of an expandable tubular member comprising an internally threaded portion, comprising:
   supporting the internally threaded portion of the expandable tubular member; and
   supporting the exterior of the end portion of the expandable tubular member;
   wherein the expandable tubular member comprises a casing for a wellbore.

7. The method of claim 6, further including:
   preventing impact to the internally threaded portion of the expandable tubular member.

8. A method of protecting the end portions of an expandable tubular members having an internally threaded portion, comprising:
   selecting the expandable tubular member;
   coupling a locking member to the internally threaded portion of the selected expandable tubular member; and
   coupling a collar to the end portion of the selected expandable tubular member and the locking member;
   wherein the wall thickness of the collar varies as a function of the wall thickness of the end portion of the selected expandable tubular member; and
   wherein the expandable tubular member comprises a casing for a wellbore.

9. The method of claim 8, further comprising:
   selecting another expandable tubular member;
   coupling a locking member to the internally threaded portion of the other selected expandable tubular member; and
   coupling a collar to the end portion of the other selected expandable tubular member and the locking member;
   wherein the wall thickness of the collar varies as a function of the wall thickness of the end portion of the selected other expandable tubular member.

10. A device for protecting an end portion of an expandable tubular member comprising an internally threaded portion, comprising:
    a locking member comprising an externally threaded portion adapted to threadably mate with the internally threaded portion of the expandable tubular member and an external flange; and
    a collar adapted to mate with the locking member and an end portion of the expandable tubular member comprising an internal flange positioned between the end portion of the expandable tubular member and the external flange of the locking member;
    wherein the expandable tubular member comprises a pipe.

11. A device for protecting an end portion of an expandable tubular member comprising an internally threaded portion, comprising:
    a locking member comprising an externally threaded portion adapted to threadably mate with the internally threaded portion of the expandable tubular member and an external flange; and
    a collar adapted to mate with the locking member and an end portion of the expandable tubular member comprising an internal flange positioned between the end portion of the expandable tubular member and the external flange of the locking member;
    wherein the expandable tubular member comprises a structural support.

12. A method of radially expanding an expandable tubular member comprising an internally threaded portion, comprising:
    selecting the expandable tubular member;
    coupling a locking member to the internally threaded portion of the selected expandable tubular member;
    coupling a collar to the end portion of the selected expandable tubular member and the locking member;
    decoupling the collar from the end portion of the selected expandable tubular member and the locking member;
    decoupling the locking member from the internally threaded portion of the selected expandable tubular member; and
    radially expanding and plastically deforming the selected expandable tubular member by a process comprising:
        positioning an expansion cone within the selected expandable tubular member; and
        displacing the expansion cone relative to the selected expandable tubular member;
    wherein the wall thickness of the collar varies as a function of the wall thickness of the end portion of the selected expandable tubular member; and
    wherein the expandable tubular member comprises a casing for a wellbore.

* * * * *

UNITED STATES PATENT AND TRADEMARK OFFICE
CERTIFICATE OF CORRECTION

PATENT NO. : 6,564,875 B1
DATED : May 20, 2003
INVENTOR(S) : Michael Bullock

It is certified that error appears in the above-identified patent and that said Letters Patent is hereby corrected as shown below:

<u>Title page,</u>
Item [73], Assignee, change "Shell Oil Company, Houston, TX (US)" to -- [73] Enventure Global Technology, Houston, TX (US) --.

Signed and Sealed this

Sixth Day of January, 2004

JAMES E. ROGAN
*Director of the United States Patent and Trademark Office*